(12) United States Patent
Kodaira (10) Patent No.: US 9,387,615 B2
(45) Date of Patent: Jul. 12, 2016

(54) INJECTION MOLDING APPARATUS, INJECTION MOLDING METHOD, AND MOLDED-PRODUCT MANUFACTURING METHOD

(71) Applicant: CANON KABUSHIKI KAISHA, Tokyo (JP)

(72) Inventor: Koki Kodaira, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/490,147

(22) Filed: Sep. 18, 2014

(65) Prior Publication Data

US 2015/0076737 A1    Mar. 19, 2015

(30) Foreign Application Priority Data

Sep. 19, 2013    (JP) .................... 2013-193852

(51) Int. Cl.
| | | |
|---|---|---|
| *B29C 45/73* | (2006.01) | |
| *B29C 33/04* | (2006.01) | |
| *B29C 45/56* | (2006.01) | |

(52) U.S. Cl.
CPC .............. *B29C 45/73* (2013.01); *B29C 33/046* (2013.01); *B29C 45/7312* (2013.01); *B29C 45/56* (2013.01); *B29C 45/7337* (2013.01); *B29K 2995/0013* (2013.01); *B29K 2995/0097* (2013.01)

(58) Field of Classification Search
CPC .............. B29C 33/046; B29C 45/7375; B29C 45/7337
See application file for complete search history.

(56) References Cited

U.S. PATENT DOCUMENTS

| | | | | |
|---|---|---|---|---|
| 2003/0141609 | A1* | 7/2003 | Jia ..................... | B29C 45/1703 264/39 |
| 2011/0059201 | A1* | 3/2011 | Jong ................. | B29C 45/7337 425/547 |

FOREIGN PATENT DOCUMENTS

| | | |
|---|---|---|
| CN | 1183073 A | 5/1998 |
| CN | 1277180 A | 12/2000 |
| CN | 1303767 A | 7/2001 |
| JP | 11-277539 A | 10/1999 |
| JP | 4698676 B2 | 6/2011 |
| WO | 98/51460 A1 | 11/1998 |

* cited by examiner

*Primary Examiner* — Jill Heitbrink
(74) *Attorney, Agent, or Firm* — Canon USA, Inc. IP Division (57) ABSTRACT

An injection molding apparatus includes a stationary mold and a movable mold, and heats and cools at least one of the stationary mold and the movable mold when forming a molded product by injecting resin into a cavity formed by the stationary mold and the movable mold. The at least one mold to be heated and cooled is separable into a first mold member and a second mold member. When heating the at least one mold, the first mold member and the second mold member are separated from each other so that a space into which thermal fluid is to be injected is formed between the first mold member and the second mold member.

10 Claims, 10 Drawing Sheets

INJECTION MOLDING APPARATUS, INJECTION MOLDING METHOD, AND MOLDED-PRODUCT MANUFACTURING METHOD

BACKGROUND OF THE INVENTION

1. Field of the Invention

The present invention relates to injection molding apparatuses, injection molding methods, and molded-product manufacturing methods that form molded products by injection-molding by heating and cooling molds.

2. Description of the Related Art

With regard to apparatuses that perform injection-molding by using resin, such as plastic, a temperature adjustment of molds is important for maintaining the quality of molded products at a satisfactory level. In particular, the molding surface of a mold is preliminarily heated prior to injection-molding, and the mold is immediately cooled after the molding.

In the related art, Japanese Patent Laid-Open No. 11-277539 discloses an apparatus that reduces the heat capacity of a heating unit.

This apparatus is a mold heating apparatus that heats a mold, which is constituted of a core and an openable-closable cavity that forms a resin molding space when the mold is in a clamped state, and has the following configuration.

Specifically, the apparatus includes a pressing movable member that applies pressure to the core so as to bring the core into pressure contact with the cavity during a mold clamping process, and a stationary pressure-receiving member that comes into contact with the cavity, with which the core is in pressure contact, so as to receive a pressing force applied to the cavity.

The apparatus further includes a core separating unit that separates the core from the pressing movable member during a mold opening process, and a heating unit that uses radiation heat to simultaneously heat both the core separated from the pressing movable member during the mold opening process and the cavity separated from the stationary pressure-receiving member.

As another solution for reducing the heat capacity of a heating unit, Japanese Patent No. 4698676 discloses the following apparatus.

This apparatus includes a cavity mold and a core mold. The cavity mold has a cavity surface that forms a cavity into which a molten injection material is to be injected. The core mold has a core surface that forms the cavity when the molds are joined. The core mold is guided by a guide pin and is provided in a forwardly and backwardly movable manner so as to open and close the cavity.

The apparatus further includes an injecting unit that injects a molding material into the cavity during an injecting process, a hydraulic cylinder that moves the core mold in the forward and backward directions, and an injection controller that controls the injecting unit for injecting the material.

The core mold has the core surface and is separable into an intermediate core mold plate having a small thickness and a core mold support plate having a large thickness. The guide pin extends from the core mold support plate. When the core mold moves toward the cavity mold, the guide pin is inserted into a first guide hole formed in the cavity mold and is fitted to the intermediate core mold plate so as to limit the movement of the intermediate core mold plate to the forward and backward directions.

Furthermore, the apparatus includes a first elastic member installed between the intermediate core mold plate and the core mold support plate so that when the core mold is moved backward for opening the cavity, the intermediate core mold plate and the core mold support plate are elastically separated from each other.

Moreover, the apparatus further includes a first heater (i.e., a heater fitted in the intermediate core) that is disposed at a separation surface of the intermediate core mold plate and that heats the intermediate core mold plate, a first cooler that cools the core mold support plate, and a mold temperature controller that controls the operation of the first heater and the first cooler so as to control the temperature of the intermediate core mold during injection.

With the configuration according to Japanese Patent Laid-Open No. 11-277539 in the related art, the heat capacity of the heating unit for the core mold and the cavity mold can be reduced.

However, since the core mold and the cavity mold are simultaneously heated by using radiation heat, it is realistically difficult to heat the core mold and the cavity mold within a short period time by using radiation heat, which has low thermal conductivity.

With the method according to Japanese Patent No. 4698676, the core mold has a core surface and is separated into an intermediate core mold plate having a small thickness and a core mold support plate having a large thickness so that the heat capacity of the heating unit can be reduced.

However, in view of a thermal fatigue breakage due to a heat cycle caused by fitting the heater in the intermediate core mold plate, the thickness is increased to about 80 mm, thus making it realistically difficult to perform heating and cooling within a short period of time.

The present invention provides an injection molding apparatus, an injection molding method, and a molded-product manufacturing method that can heat and cool a mold within a short period of time when forming a molded product by injection-molding by heating and cooling the mold, thus allowing for improved quality of the molded product.

SUMMARY OF THE INVENTION

An injection molding apparatus according to the present invention includes a stationary mold and a movable mold, and heats and cools at least one of the stationary mold and the movable mold when forming a molded product by injecting resin into a cavity formed by the stationary mold and the movable mold. The at least one mold to be heated and cooled is separable into a first mold member and a second mold member. When heating the at least one mold, the first mold member and the second mold member are separated from each other so that a space into which thermal fluid is to be injected is formed between the first mold member and the second mold member.

An injection molding method according to the present invention includes a step for heating and cooling at least one of a stationary mold and a movable mold when forming a molded product by injecting resin into a cavity formed by the stationary mold and the movable mold. The at least one mold to be heated and cooled is a mold that is separable into a first mold member and a second mold member. The step for heating the at least one mold includes separating the first mold member and the second mold member from each other and injecting thermal fluid into a space formed between the first mold member and the second mold member.

A molded-product manufacturing method according to the present invention includes a step for heating at least one of a stationary mold and a movable mold; a mold closing step for bringing the stationary mold and the movable mold into contact with each other and forming a cavity; a step for forming a molded product by injecting resin into the cavity and cooling the resin; and a step for separating the stationary mold and the movable mold from each other and removing the molded product. The step for heating the at least one mold includes separating the at least one mold into a first mold member and a second mold member so as to form a space between the first mold member and the second mold member, and injecting thermal fluid into the formed space.

Further features of the present invention will become apparent from the following description of exemplary embodiments with reference to the attached drawings.

DESCRIPTION OF THE EMBODIMENTS

An injection molding apparatus, an injection molding method, and a molded-product manufacturing method according to embodiments of the present invention will now be described.

The following description relates to a configuration example that includes a stationary mold and a movable mold and that heats and cools at least one of the stationary mold and the movable mold when forming a molded product by injecting resin into a cavity formed by the stationary mold and the movable mold.

First Embodiment

Figure 1:
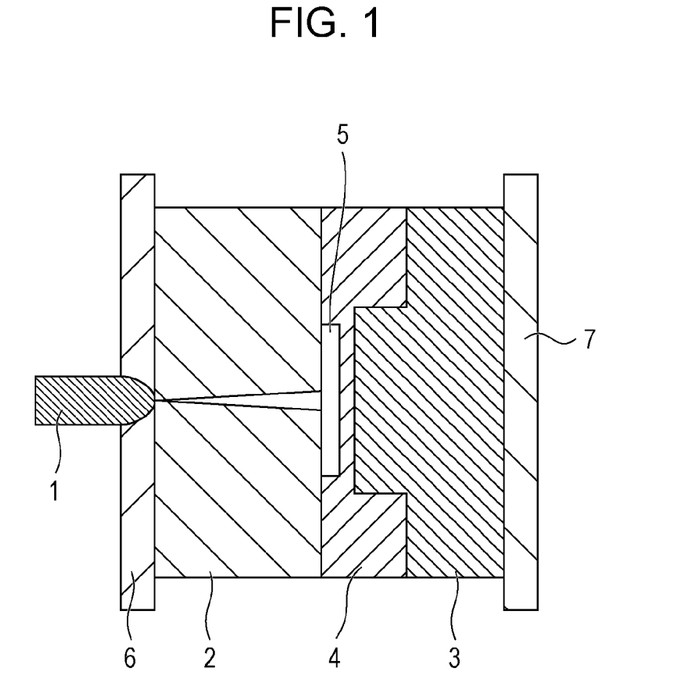
FIG. 1 illustrates a state where molds are completely closed in an injection molding method according to a first embodiment of the present invention.

FIG. 1 illustrates a state where the molds are completely closed in an injection molding method according to a first embodiment.

In FIG. 1, reference numeral 1 denotes an injection unit, 2 denotes a stationary mold plate (i.e., stationary mold), 3 denotes a first movable mold member (i.e., first mold member) at the platen side of a movable mold, and 4 denotes a second movable mold member (i.e., second mold member) at the cavity side of the movable mold.

The first movable mold member 3 (i.e., first mold member) and the second movable mold member 4 (i.e., second mold member) are separable from each other.

Figure 2:
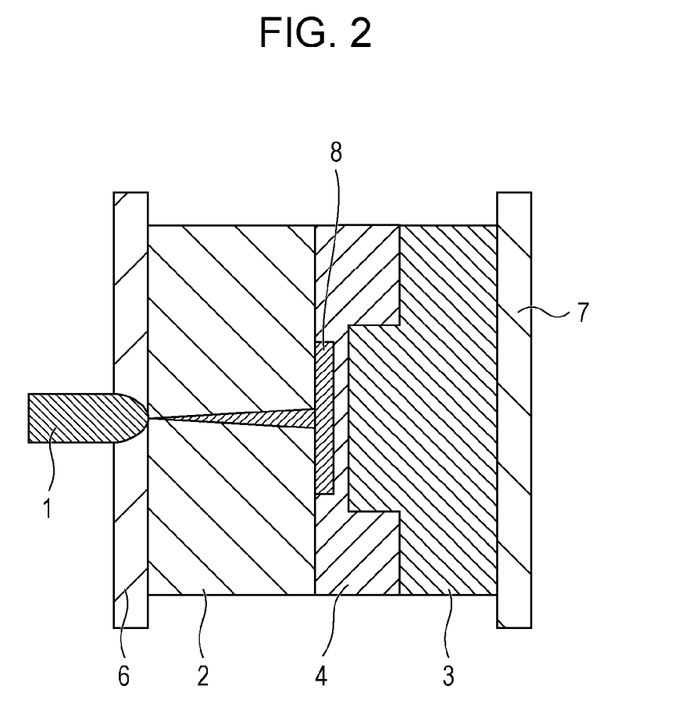
FIG. 2 illustrates an injecting step, a pressure-maintaining step, and a cooling step in the injection molding method according to the first embodiment of the present invention.

Reference numeral 5 denotes a cavity into which molten resin flows, 6 denotes a stationary platen, and 7 denotes a movable platen. FIG. 2 illustrates an injecting step, a pressure-maintaining step, and a cooling step in the injection molding method according to the first embodiment.

In FIG. 2, reference numeral 8 denotes a shaped product in a state where the cavity 5 is filled with resin.

Figure 3:
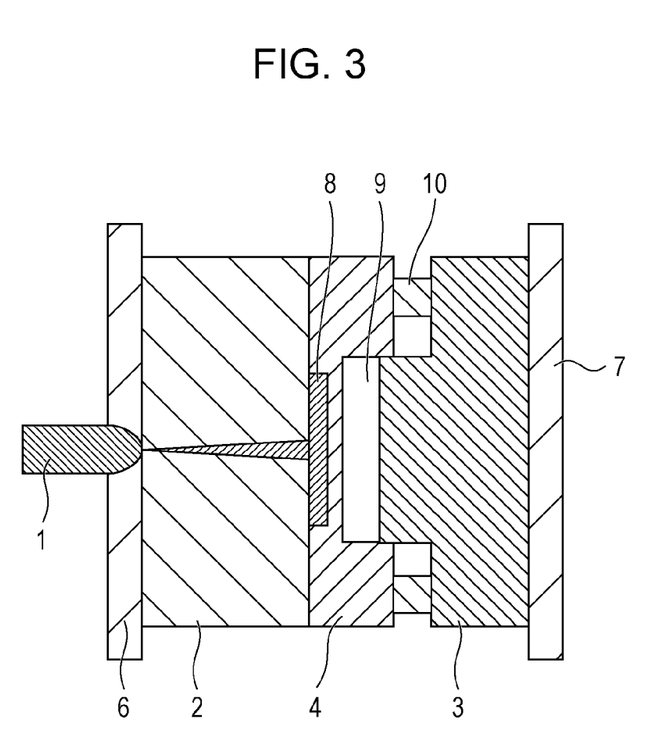
FIG. 3 illustrates a mold opening step in the injection molding method according to the first embodiment of the present invention.

FIG. 3 illustrates a mold opening step in the injection molding method according to the first embodiment.

Reference numeral 9 denotes a space formed by the first movable mold member 3 and the second movable mold member 4, and 10 denotes a guide pin.

Figure 4:
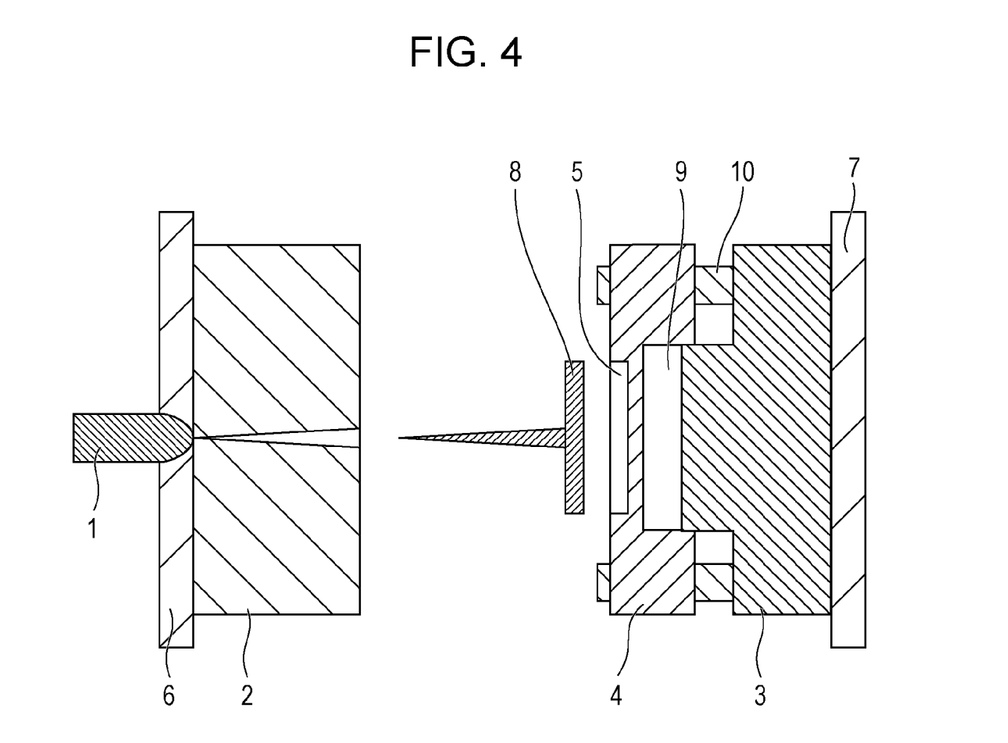
FIG. 4 illustrates a state where the mold opening step is completed in the injection molding method according to the first embodiment of the present invention.

FIG. 4 illustrates a state where the mold opening step is completed in the injection molding method according to the first embodiment.

Figure 5:
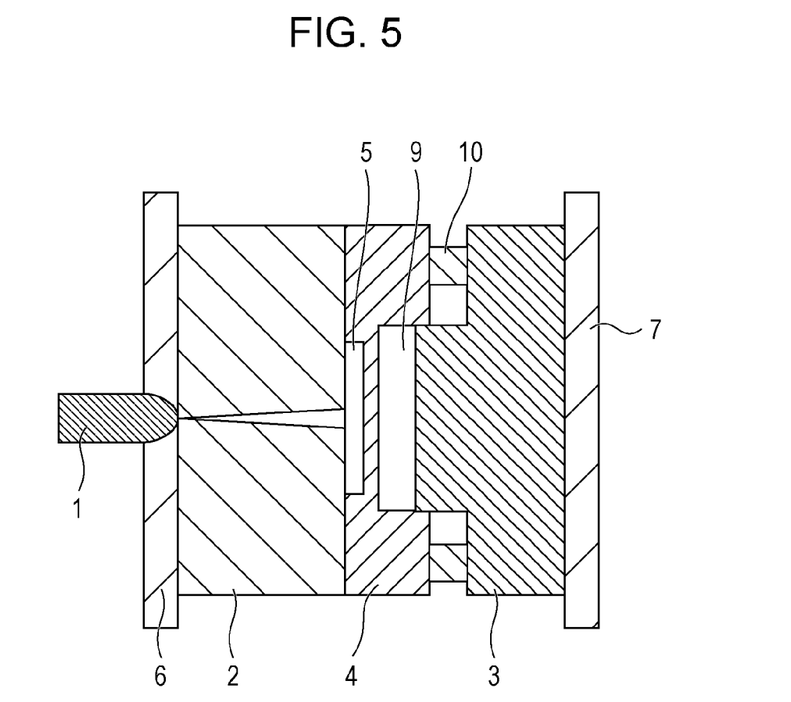
FIG. 5 illustrates a mold closing step in the injection molding method according to the first embodiment of the present invention.

FIG. 5 illustrates a mold closing step in the injection molding method according to the first embodiment.

FIGS. 1 to 5 described above illustrate a series of steps in the first embodiment according to the present invention.

These steps will be described in further detail with reference to FIGS. 1 to 5. Specifically, in FIG. 1, a predetermined mold clamping force from the molding apparatus is applied to the stationary platen 6 and the movable platen 7.

Moreover, the injection unit 1 is in pressure contact toward the stationary platen 6 with a force sufficiently smaller than the mold clamping force.

Referring to FIG. 2, in a subsequent step, resin is ejected from the injection unit 1 so as to be injected into the cavity 5. In this state, a pressure-maintaining step and a cooling step are performed.

Referring to FIG. 3, in a subsequent step, the predetermined mold clamping force applied from the molding apparatus to the stationary platen 6 and the movable platen 7 is released.

Then, as a first mold opening step, the movable platen 7 is receded, and the first movable mold member 3 and the second movable mold member 4 are separated from each other prior to separating the stationary mold plate 2 and the second movable mold member 4 from each other.

With regard to the second movable mold member 4, a portion thereof that is in contact with the cavity 5 has a thickness ranging between 1 mm and 20 mm. Desirably, the thickness may range between 3 mm and 8 mm.

As a technique for separating the first movable mold member 3 and the second movable mold member 4 from each other prior to separating the stationary mold plate 2 and the second movable mold member 4 from each other, an elastic member, such as a spring, may be provided between the first movable mold member 3 and the second movable mold member 4 so that the second movable mold member 4 is pressed against the stationary mold plate 2 when the movable platen 7 recedes.

Alternatively, a magnetic block may be disposed between the stationary mold plate 2 and the second movable mold member 4 so that the second movable mold member 4 attaches to the stationary mold plate 2 when the movable platen 7 recedes. An arbitrary mold opening distance is set between the first movable mold member 3 and the second movable mold member 4, and the two mold members are regulated by, for example, a stopper. In FIG. 4, the stationary mold plate 2 and the second movable mold member 4 are separated from each other when the distance between the first movable mold member 3 and the second movable mold member 4 exceeds the arbitrary mold opening distance.

When the movable platen 7 reaches a preset receding limit, the mold opening step is completed.

In a subsequent step, the shaped product 8 is made to protrude from the movable side by an ejector rod and is removed from the molding-apparatus space.

Instead of using the ejector rod, this protruding process may be performed from the stationary side by using a tension link connected to an ejector plate provided within the stationary mold plate 2.

Thermal fluid is injected into the space 9 simultaneously with the removal of the shaped product 8 from the molding-apparatus space.

The space 9 is desirably a closed space excluding an inlet and outlet for the thermal fluid. This state is maintained for a predetermined time period, and the second movable mold member 4 is heated to a predetermined temperature.

The thermal fluid may be, for example, compressed air, nitrogen, hydrogen, carbonic acid gas, ammonia gas, helium, Freon-12, saturated vapor, superheated vapor, water, methyl chloride, a lubricant, transformer oil, spindle oil, ethyl glycol, ethyl alcohol, or light-oil combustion gas.

The timing for injecting the thermal fluid into the space 9 is not limited to the timing at which the shaped product 8 is removed, and may be any time from a time point immediately after the stationary mold plate 2 and the second movable mold member 4 are separated from each other to a time point at which the stationary mold plate 2 and the second movable mold member 4 are brought into contact with each other again.

Furthermore, the projected area of the space 9 onto the cavity 5 is desirably larger than the outer periphery of the cavity 5.

Referring to FIG. 5, a mold closing step is performed as a subsequent step. The movable platen 7 is advanced so that the stationary mold plate 2 and the second movable mold member 4 are brought into contact with each other.

Then, the first movable mold member 3 and the second movable mold member 4 are brought into contact with each other. The first movable mold member 3 is desirably composed of a material with high thermal conductivity, such as a copper alloy or an aluminum alloy.

By using a material with high thermal conductivity, a better cooling effect can be achieved. Subsequently, a predetermined mold clamping force from the molding apparatus is applied to the stationary platen 6 and the movable platen 7.

The above-described steps in FIGS. 1 to 5 correspond to a series of molding steps. By repeating these steps, mass production molding can be achieved.

Second Embodiment

Next, a second embodiment that is different from the first embodiment described above will be described below with reference to FIGS. 6 to 10.

Figure 6:
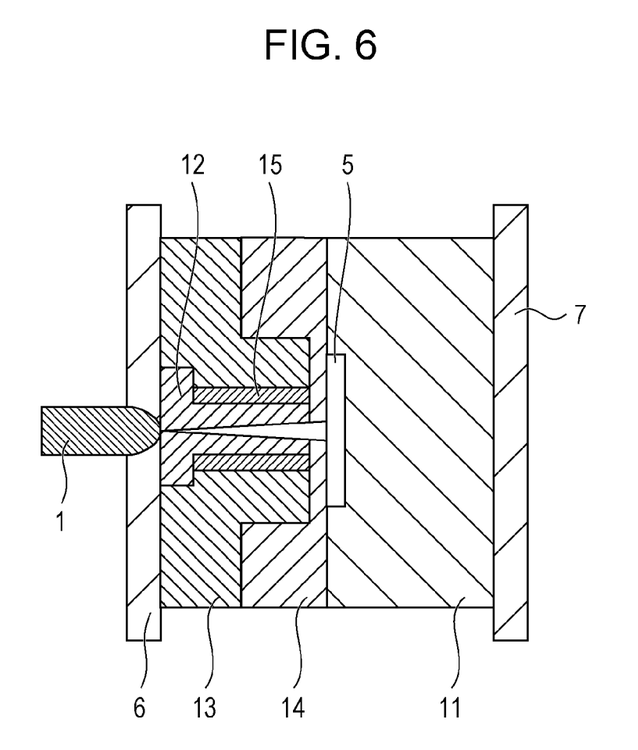
FIG. 6 illustrates a state where molds are completely closed in an injection molding method according to a second embodiment of the present invention.

FIG. 6 illustrates a state where the molds are completely closed in the second embodiment.

In FIG. 6, reference numeral 11 denotes a movable mold plate, 12 denotes a sprue, 13 denotes a first platen-side stationary mold member (i.e., first mold member), and denotes a second cavity-side stationary mold member (i.e., second mold member).

Reference numeral 15 denotes a sleeve, which is engaged with the second stationary mold member 14.

Figure 7:
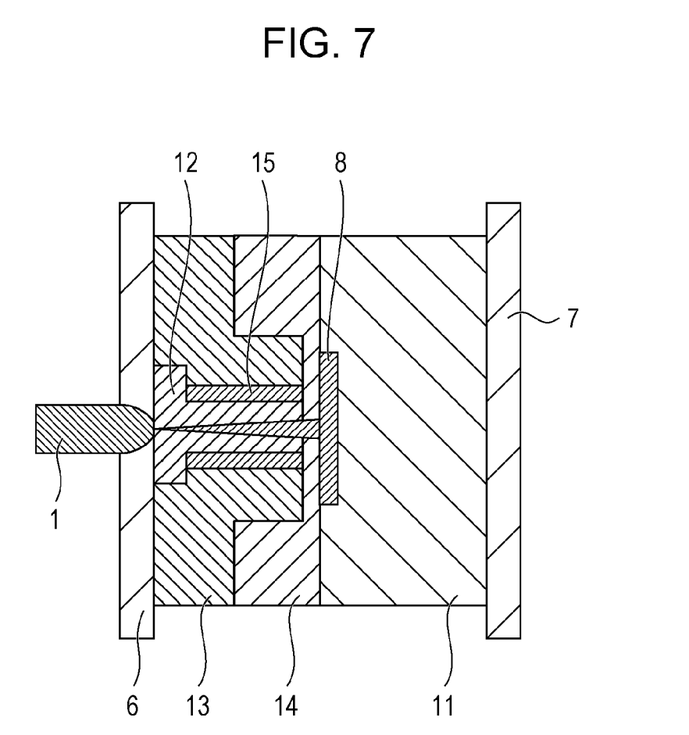
FIG. 7 illustrates an injecting step, a pressure-maintaining step, and a cooling step in the injection molding method according to the second embodiment of the present invention.

FIG. 7 illustrates an injecting step, a pressure-maintaining step, and a cooling step in the second embodiment.

Figure 8:
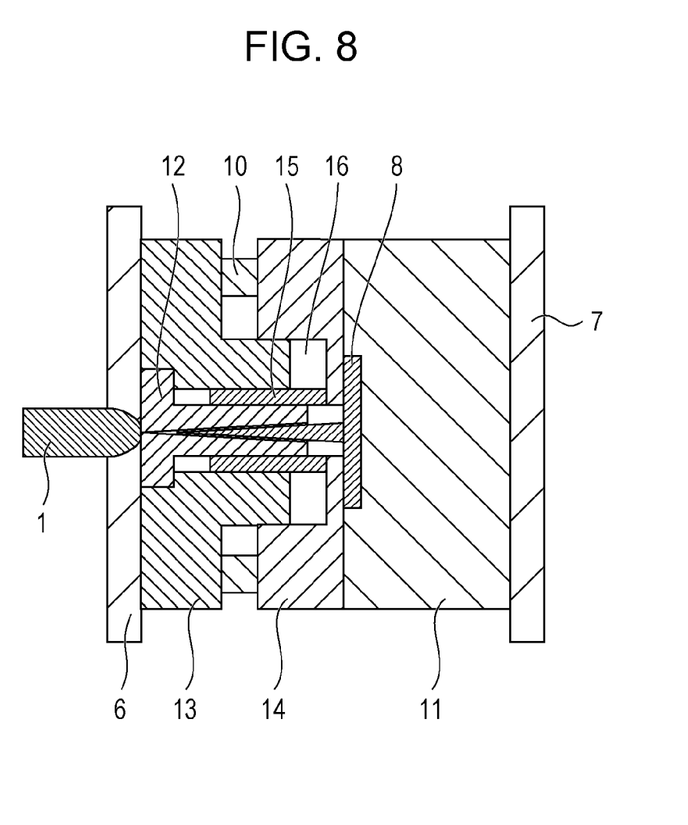
FIG. 8 illustrates a mold opening step in the injection molding method according to the second embodiment of the present invention.

FIG. 8 illustrates a mold opening step in the second embodiment.

Reference numeral 16 denotes a space formed by the first stationary mold member 13, the second stationary mold member 14, and the sleeve 15.

Figure 9:
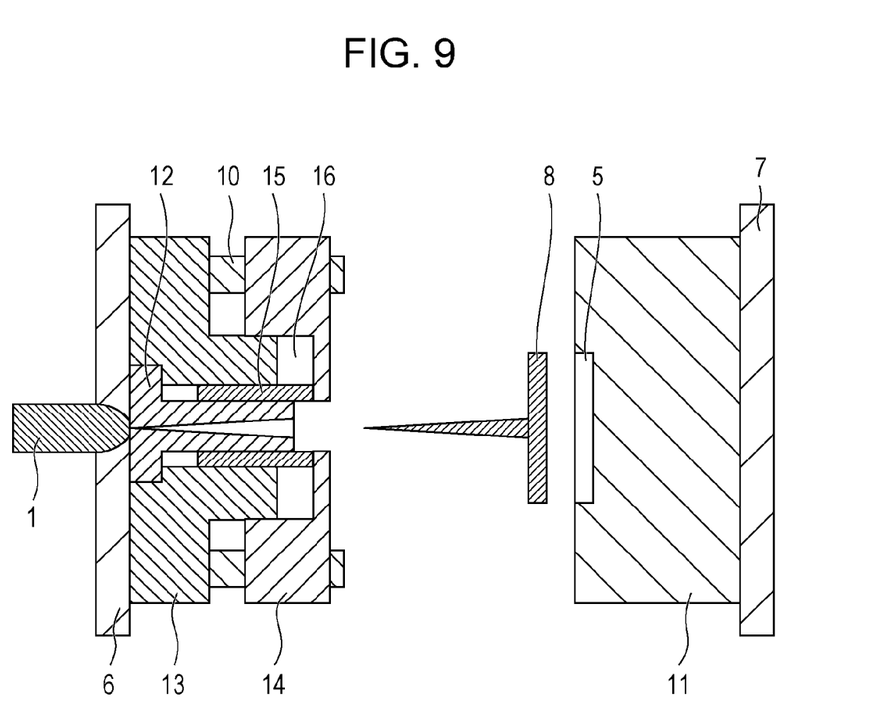
FIG. 9 illustrates a state where the mold opening step is completed in the injection molding method according to the second embodiment of the present invention.

FIG. 9 illustrates a state where the mold opening step is completed in the second embodiment.

Figure 10:
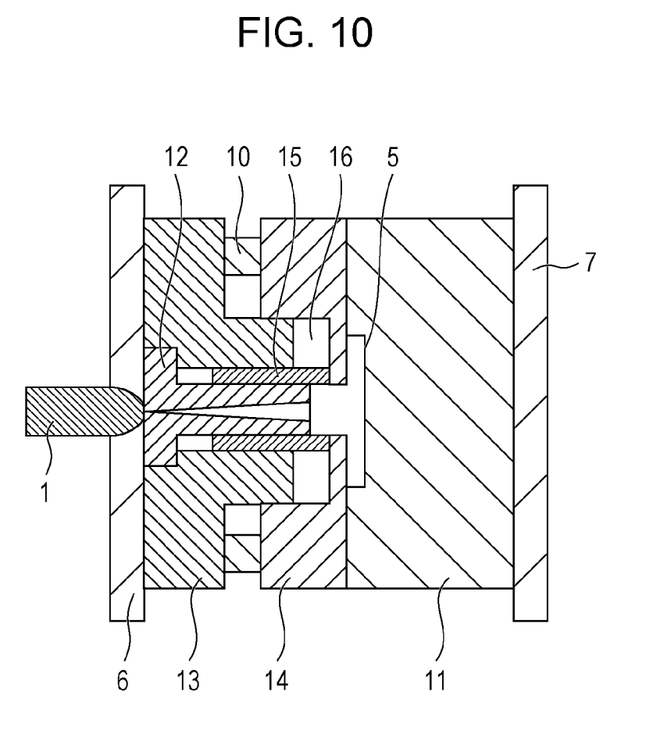
FIG. 10 illustrates a mold closing step in the injection molding method according to the second embodiment of the present invention.

FIG. 10 illustrates a mold closing step in the second embodiment.

FIGS. 6 to 10 illustrate a series of steps in the second embodiment.

These steps will be described in further detail with reference to FIGS. 6 to 10. Specifically, in FIG. 6, a predetermined mold clamping force from the molding apparatus is applied to the stationary platen 6 and the movable platen 7.

Moreover, the injection unit 1 is in pressure contact with the sprue 12 toward the stationary platen 6 with a force sufficiently smaller than the mold clamping force.

Referring to FIG. 7, in a subsequent step, resin is ejected from the injection unit 1 so as to be injected into the cavity 5. In this state, a pressure-maintaining step and a cooling step are performed.

Referring to FIG. 8, in a subsequent step, the predetermined mold clamping force applied from the molding apparatus to the stationary platen 6 and the movable platen 7 is released.

Then, as a first mold opening step, the movable platen 7 is receded, and the first stationary mold member 13 and the second stationary mold member 14 are separated from each other prior to separating the second stationary mold member 14 and the movable mold plate 11 from each other.

With regard to the second stationary mold member 14, a portion thereof that is in contact with the cavity 5 has a thickness ranging between 1 mm and 20 mm. Desirably, the thickness may range between 3 mm and 8 mm.

As a technique for separating the first stationary mold member 13 and the second stationary mold member 14 from each other prior to separating the second stationary mold member 14 and the movable mold plate 11 from each other, an elastic member, such as a spring, may be provided between the first stationary mold member 13 and the second stationary mold member 14 so that the second stationary mold member 14 is pressed against the movable mold plate 11 when the movable platen 7 recedes.

Alternatively, a magnetic block may be disposed between the second stationary mold member 14 and the movable mold plate 11 so that the second stationary mold member 14 attaches to the movable mold plate 11 when the movable platen 7 recedes.

An arbitrary mold opening distance is set between the first stationary mold member 13 and the second stationary mold member 14, and the two mold members are regulated by, for example, a stopper.

In this case, since the sleeve 15 is engaged with the second stationary mold member 14, the sleeve 15 becomes separated from the sprue 12 by the arbitrary mold opening distance.

In FIG. 9, the second stationary mold member 14 and the movable mold plate 11 are separated from each other when the distance between the first stationary mold member 13 and the second stationary mold member 14 exceeds the arbitrary mold opening distance.

When the movable platen 7 reaches a preset receding limit, the mold opening step is completed.

In a subsequent step, the shaped product 8 is made to protrude from the movable side by an ejector rod and is removed from the molding-apparatus space. Thermal fluid is injected into the space 16 simultaneously with the removal of the shaped product 8 from the molding-apparatus space. The thermal fluid may be, for example, compressed air, nitrogen, hydrogen, carbonic acid gas, ammonia gas, helium, Freon-12, saturated vapor, superheated vapor, water, methyl chloride, a lubricant, transformer oil, spindle oil, ethyl glycol, ethyl alcohol, or light-oil combustion gas.

The space 16 is desirably a closed space excluding an inlet and outlet for the thermal fluid. This state is maintained for a predetermined time period, and the second stationary mold member 14 is heated to a predetermined temperature. The timing for injecting the thermal fluid into the space 16 is not limited to the timing at which the shaped product 8 is removed, and may be any time from a time point immediately after the second stationary mold member 14 and the movable mold plate 11 are separated from each other to a time point at which the first stationary mold member 13 and the second stationary mold member 14 are brought into contact with each other again.

Furthermore, the projected area of the space 16 onto the cavity 5 is desirably larger than the outer periphery of the cavity 5.

Referring to FIG. 10, a mold closing step is performed as a subsequent step. The movable platen 7 is advanced so that the second stationary mold member 14 and the movable mold plate 11 are brought into contact with each other.

Then, the first stationary mold member 13 and the second stationary mold member 14 are brought into contact with each other. The first stationary mold member 13 is desirably composed of a material with high thermal conductivity, such as a copper alloy or an aluminum alloy.

By using a material with high thermal conductivity, a better cooling effect can be achieved. Subsequently, a predetermined mold clamping force from the molding apparatus is applied to the stationary platen 6 and the movable platen 7. The above-described steps in FIGS. 6 to 10 correspond to a series of molding steps. By repeating these steps, mass production molding can be achieved.

EXAMPLES

Examples according to the present invention will be described below.

Example 1

A molded product is manufactured based on the method according to the first embodiment.

Specifically, a predetermined mold clamping force applied from the molding apparatus to the stationary platen 6 and the movable platen 7 is defined as F, and a nozzle touch force from the injection unit 1 toward the stationary platen 6 is defined as f. Resin is injected into the cavity 5 for an injection time period t1. In this state, a pressure-maintaining step is performed for a pressure-maintaining time period t2, and a cooling step is performed for a cooling time period t3.

Then, the predetermined mold clamping force applied from the molding apparatus to the stationary platen 6 and the movable platen 7 is released. The movable platen 7 is receded for a mold opening time period t4, and the first movable mold member 3 and the second movable mold member 4 are separated from each other prior to separating the second movable mold member 4 and the stationary mold plate 2 from each other. A portion of the second movable mold member 4 that is in contact with the cavity 5 has a thickness X.

As a technique for separating the first movable mold member 3 and the second movable mold member 4 from each other prior to separating the stationary mold plate 2 and the second movable mold member 4 from each other, an elastic member, such as a spring, is provided between the first movable mold member 3 and the second movable mold member 4.

An arbitrary mold opening distance L is set between the first movable mold member 3 and the second movable mold member 4, and the two mold members are regulated by, for example, a stopper.

The stationary mold plate 2 and the second movable mold member 4 are separated from each other when the distance between the first movable mold member 3 and the second movable mold member 4 exceeds the arbitrary mold opening distance.

When the movable platen 7 reaches a preset receding limit, the mold opening step is completed. The molded product is made to protrude by an ejector rod and is removed from the molding-apparatus space.

Thermal fluid is injected into the space 9 formed of a closed space simultaneously with the removal of the molded product from the molding-apparatus space.

Furthermore, the projected area of the space 9 onto the cavity 5 is larger than the outer periphery of the cavity 5.

This state is maintained for a predetermined heating time period th, and the second movable mold member 4 is heated to a predetermined temperature T. Then, the molds are closed for a mold closing time period t5.

The movable platen 7 is advanced so that the first movable mold member 3 and the second movable mold member 4 are brought into contact with each other.

Then, the stationary mold plate 2 and the second movable mold member 4 are brought into contact with each other. A predetermined mold clamping force from the molding apparatus is applied to the stationary platen 6 and the movable platen 7. The molding steps described above have been performed.

The relationships among various kinds of forces, time periods, and so on are shown in Table 1 below.

TABLE 1

| | |
|---|---|
| Mold Clamping Force F | 450 tons |
| Nozzle Touch Force f | 10 tons |
| Injection Time Period t1 | 2 seconds |
| Pressure-Maintaining Time Period t2 | 3 seconds |
| Cooling Time Period t3 | 15 seconds |
| Mold Opening Time Period t4 | 3 seconds |
| Mold Closing Time Period t5 | 3 seconds |
| Predetermined Heating Time Period th | 8 seconds |
| Arbitrary Mold Opening Distance L | 30 mm |
| Predetermined Temperature T | 95 degrees |
| Thickness X | 5 mm |
| State of Space 9 | Closed Space |
| State of Projected Area of Space 9 onto Cavity | Larger Than Outer Periphery of Cavity |

A molding cycle time that compares favorably with the molding cycle time in the related art can be achieved without defective appearance in the molded product.

Example 2

In Example 2, a molding process is performed by using a molding apparatus with a mold clamping force F smaller than that in Example 1.

The relationships among various kinds of forces, time periods, and so on are shown in Table 2 below.

TABLE 2

| | |
|---|---|
| Mold Clamping Force F | 180 tons |
| Nozzle Touch Force f | 5 tons |
| Injection Time Period t1 | 1 second |
| Pressure-Maintaining Time Period t2 | 2 seconds |
| Cooling Time Period t3 | 10 seconds |
| Mold Opening Time Period t4 | 2 seconds |
| Mold Closing Time Period t5 | 2.5 seconds |
| Predetermined Heating Time Period th | 6 seconds |
| Arbitrary Mold Opening Distance L | 15 mm |
| Predetermined Temperature T | 95 degrees |
| Thickness X | 5 mm |
| State of Space 9 | Closed Space |
| State of Projected Area of Space 9 onto Cavity | Larger Than Outer Periphery of Cavity |

Results of the molding process according to Example 2 indicate that, similar to Example 1, a molding cycle time that compares favorably with the molding cycle time in the related art can be achieved without defective appearance in the molded product.

Example 3

In Example 3, a molding process is performed by setting the predetermined temperature T lower than that in Example 1.

The relationships among various kinds of forces, time periods, and so on are shown in Table 3 below.

TABLE 3

| | |
|---|---|
| Mold Clamping Force F | 450 tons |
| Nozzle Touch Force f | 10 tons |
| Injection Time Period t1 | 2 seconds |
| Pressure-Maintaining Time Period t2 | 3 seconds |
| Cooling Time Period t3 | 15 seconds |
| Mold Opening Time Period t4 | 3 seconds |
| Mold Closing Time Period t5 | 3 seconds |
| Predetermined Heating Time Period th | 8 seconds |
| Arbitrary Mold Opening Distance L | 30 mm |
| Predetermined Temperature T | 70 degrees |
| Thickness X | 5 mm |
| State of Space 9 | Closed Space |
| State of Projected Area of Space 9 onto Cavity | Larger Than Outer Periphery of Cavity |

Results of the molding process according to Example 3 indicate that defective appearance in the molded product cannot be suppressed, as compared with Example 1.

Example 4

Example 4 is different from Example 1 in that a molding process is performed in a state where the space 9 is formed of an open space.

The relationships among various kinds of forces, time periods, and so on are shown in Table 4 below.

TABLE 4

| | |
|---|---|
| Mold Clamping Force F | 450 tons |
| Nozzle Touch Force f | 10 tons |
| Injection Time Period t1 | 2 seconds |
| Pressure-Maintaining Time Period t2 | 3 seconds |
| Cooling Time Period t3 | 15 seconds |
| Mold Opening Time Period t4 | 3 seconds |
| Mold Closing Time Period t5 | 3 seconds |
| Predetermined Heating Time Period th | 13 seconds |
| Arbitrary Mold Opening Distance L | 30 mm |
| Predetermined Temperature T | 95 degrees |
| Thickness X | 5 mm |
| State of Space 9 | Open Space |
| State of Projected Area of Space 9 onto Cavity | Larger Than Outer Periphery of Cavity |

Results of the molding process according to Example 4 indicate that, similar to Example 1, a molding cycle time that is slightly longer than the molding cycle time in the related art can be achieved without defective appearance in the molded product, and a significant increase in molding cost can be prevented.

However, as compared with Example 1 in which the space 9 is formed of a closed space, the heating efficiency is lower.

Example 5

Example 5 is different from Example 1 in that a molding process is performed in a state where the projected area of the space 9 onto the cavity 5 is smaller than the outer periphery of the cavity 5.

The relationships among various kinds of forces, time periods, and so on are shown in Table 5 below.

TABLE 5

| | |
|---|---|
| Mold Clamping Force F | 450 tons |
| Nozzle Touch Force f | 10 tons |
| Injection Time Period t1 | 2 seconds |
| Pressure-Maintaining Time Period t2 | 3 seconds |
| Cooling Time Period t3 | 15 seconds |
| Mold Opening Time Period t4 | 3 seconds |
| Mold Closing Time Period t5 | 3 seconds |
| Predetermined Heating Time Period th | 8 seconds |
| Arbitrary Mold Opening Distance L | 30 mm |
| Predetermined Temperature T | 95 degrees |
| Thickness X | 5 mm |
| State of Space 9 | Closed Space |
| State of Projected Area of Space 9 onto Cavity | Smaller Than Outer Periphery of Cavity |

Results of the molding process according to Example 5 indicate that defective appearance in the molded product cannot be suppressed, as compared with Example 1.

Example 6

Example 6 is different from Example 1 in that a molding process is performed in a state where the thickness X is 0.5 mm.

The relationships among various kinds of forces, time periods, and so on are shown in Table 6 below.

TABLE 6

| | |
|---|---|
| Mold Clamping Force F | 450 tons |
| Nozzle Touch Force f | 10 tons |
| Injection Time Period t1 | 2 seconds |
| Pressure-Maintaining Time Period t2 | 3 seconds |

TABLE 6-continued

| | |
|---|---|
| Cooling Time Period t3 | 15 seconds |
| Mold Opening Time Period t4 | 3 seconds |
| Mold Closing Time Period t5 | 3 seconds |
| Predetermined Heating Time Period th | 5 seconds |
| Arbitrary Mold Opening Distance L | 30 mm |
| Predetermined Temperature T | 95 degrees |
| Thickness X | 0.5 mm |
| State of Space 9 | Closed Space |
| State of Projected Area of Space 9 onto Cavity | Larger Than Outer Periphery of Cavity |

Results of the molding process according to Example 6 indicate that, although defective appearance in the molded product can be suppressed, the second movable mold member 4 cannot withstand the molding pressure, making it difficult to perform successive molding, as compared with Example 1.

Example 7

Example 7 is different from Example 1 in that a molding process is performed in a state where the thickness X is 30 mm.

The relationships among various kinds of forces, time periods, and so on are shown in Table 7 below.

TABLE 7

| | |
|---|---|
| Mold Clamping Force F | 450 tons |
| Nozzle Touch Force f | 10 tons |
| Injection Time Period t1 | 2 seconds |
| Pressure-Maintaining Time Period t2 | 3 seconds |
| Cooling Time Period t3 | 15 seconds |
| Mold Opening Time Period t4 | 3 seconds |
| Mold Closing Time Period t5 | 3 seconds |
| Predetermined Heating Time Period th | 40 seconds |
| Arbitrary Mold Opening Distance L | 30 mm |
| Predetermined Temperature T | 95 degrees |
| Thickness X | 30 mm |
| State of Space 9 | Closed Space |
| State of Projected Area of Space 9 onto Cavity | Larger Than Outer Periphery of Cavity |

With the molding process according to Example 7, although defective appearance in the molded product can be suppressed, the molding cycle time undesirably increases.

According to the present invention described above, a mold plate with a small heat capacity is heated and cooled so that a molded product having good external appearance can be produced with a small heat quantity. In addition, the heating process can be performed efficiently within a short period of time.

Consequently, a molded product having good external appearance can be produced at low cost.

The present invention can provide an injection molding apparatus, an injection molding method, and a molded-product manufacturing method that can heat and cool a mold within a short period of time when forming a molded product by injection-molding by heating and cooling the mold, thus allowing for improved quality of the molded product.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-193852 filed Sep. 19, 2013, which is hereby incorporated by reference herein in its entirety.

What is claimed is:

1. An injection molding apparatus comprising:
a stationary mold; and
a movable mold,
wherein at least one of the stationary mold and the movable mold is separable into a first mold member at a platen side and a second mold member at a cavity side,
wherein when the first mold member and the second mold member are separated from each other, the first mold member and the second mold member are capable of forming, between the first mold member and the second mold member, a space into which thermal fluid is able to be injected,
wherein the first mold member is composed of a material with thermal conductivity higher than that of the second mold member, and
wherein a portion of the second mold member that is in contact with the cavity has a thickness ranging between 1 mm and 20 mm.

2. The injection molding apparatus according to claim 1, wherein the space is a closed space excluding an inlet and outlet for the thermal fluid formed by the first mold member and the second mold member.

3. The injection molding apparatus according to claim 1, wherein a projected area of the space onto the cavity is larger than an outer periphery of the cavity.

4. An injection molding method comprising:
a step for heating at least one of a stationary mold and a movable mold; and
a step for cooling the at least one mold to be heated,
wherein the at least one mold to be heated and cooled is a mold that is separable into a first mold member at a platen side and a second mold member at a cavity side,
wherein the step for heating includes forming a space between the first mold member and the second mold member by separating the first mold member and the second mold member from each other and injecting thermal fluid into the space,
wherein the step for cooling includes bringing the first mold member and the second mold member into contact with each other,
wherein the first mold member is composed of a material with thermal conductivity higher than that of the second mold member, and
wherein a portion of the second mold member that is in contact with the cavity has a thickness ranging between 1 mm and 20 mm.

5. The injection molding method according to claim 4, wherein the space is a closed space excluding an inlet and outlet for the thermal fluid formed by the first mold member and the second mold member.

6. The injection molding method according to claim 4, wherein the step for heating is performed in a mold opening step for separating the stationary mold and the movable mold from each other, and
wherein the first mold member and the second mold member are separated from each other prior to separating a mold, which is other than the at least one mold among the stationary mold and the movable mold, and the second mold member from each other.

7. The injection molding method according to claim 4, wherein a projected area of the space onto the cavity is larger than an outer periphery of the cavity.

8. A method of manufacturing a molded product comprising:
- a step for heating at least one of a stationary mold and a movable mold;
- a mold closing step for bringing the stationary mold and the movable mold into contact with each other and forming a cavity;
- a step for forming a molded product by injecting resin into the cavity and cooling the resin; and
- a step for separating the stationary mold and the movable mold from each other and removing the molded product,
- wherein the step for heating the at least one mold includes separating the at least one mold into a first mold member and a second mold member so as to form a space between the first mold member and the second mold member, and injecting thermal fluid into the formed space,
- wherein the step for cooling the resin includes bringing the first mold member and the second mold member into contact with each other,
- wherein the first mold member is composed of a material with thermal conductivity higher than that of the second mold member, and
- wherein a portion of the second mold member that is in contact with the cavity has a thickness ranging between 1 mm and 20 mm.

9. The method of manufacturing a molded product according to claim 8,
wherein the at least one mold is the movable mold.

10. The method of manufacturing a molded product according to claim 8,
wherein the at least one mold is the stationary mold.

* * * * *